(12) United States Patent  (10) Patent No.: US 12,151,703 B2
Köstermann et al.  (45) Date of Patent: Nov. 26, 2024

(54) VEHICLE, DEVICE, COMPUTER PROGRAM AND METHOD FOR IMPLEMENTATION IN A VEHICLE

(71) Applicant: VOLKSWAGEN AKTIENGESELLSCHAFT, Wolfsburg (DE)

(72) Inventors: Janis Köstermann, Berlin (DE); Hendrik Hoppmann, Braunschweig (DE); Jörg Voltmer, Hannover (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 383 days.

(21) Appl. No.: 17/495,175

(22) Filed: Oct. 6, 2021

(65) Prior Publication Data

US 2022/0105956 A1   Apr. 7, 2022

(30) Foreign Application Priority Data

Oct. 6, 2020   (DE) ...................... 10 2020 212 565.1

(51) Int. Cl.
*B60W 60/00*   (2020.01)
*B60W 50/10*   (2012.01)
*H04W 4/46*   (2018.01)

(52) U.S. Cl.
CPC .......... *B60W 60/001* (2020.02); *B60W 50/10* (2013.01); *H04W 4/46* (2018.02)

(58) Field of Classification Search
CPC .. B60W 50/045; B60W 50/10; B60W 60/001; H04W 12/06; H04W 4/38; H04W 4/46; H04W 56/0035; H04W 4/44; H04W 12/065; H04W 12/106; H04W 12/108; H04W 12/10; G08G 1/161; G08G 1/093; G08G 1/09675; G08G 1/096791;
(Continued)

(56) References Cited

U.S. PATENT DOCUMENTS 6,449,555 B1 *   9/2002   Ohba ..................... G08G 1/017
                                                              340/928
8,169,338 B2    5/2012   Mudalige
9,393,958 B2 *   7/2016   Stählin .................. G01M 17/00
(Continued)

FOREIGN PATENT DOCUMENTS

DE   102004017602 A1   10/2005
DE   102009034214 A1   4/2010
(Continued)

OTHER PUBLICATIONS

KR 20190120105 A machine translation (Year: 2019).*
(Continued)

*Primary Examiner* — Angelina M Shudy
*Assistant Examiner* — Mark Robert Heim
(74) *Attorney, Agent, or Firm* — Barnes & Thornburg LLP

(57) ABSTRACT

A transportation vehicle, a device, a computer program, and a method to be performed in a transportation vehicle. The method includes receiving environment information relating to an environment of the transportation vehicle from another transportation vehicle, validating the environment information to generate reliability information relating to the environment information, and transmitting the environment information with the reliability information.

25 Claims, 4 Drawing Sheets

(58) Field of Classification Search
CPC ..... G08G 1/0112; H04L 67/12; H04L 1/0082; H04L 67/61
See application file for complete search history.

(56) References Cited

U.S. PATENT DOCUMENTS

| | | | |
|---|---|---|---|
| 9,478,079 | B2 | 10/2016 | Lenhardt et al. |
| 9,830,816 | B1* | 11/2017 | Murray ................. H04B 17/12 |
| 10,026,314 | B1* | 7/2018 | Philosof ........... G08G 1/096791 |
| 10,032,318 | B1* | 7/2018 | Ferguson ............. G07C 5/0891 |
| 10,757,485 | B2* | 8/2020 | Al-Stouhi .............. G07C 5/008 |
| 10,760,926 | B2 | 9/2020 | Engel et al. |
| 11,009,602 | B2 | 5/2021 | Correia et al. |
| 11,129,024 | B2* | 9/2021 | Stählin ................ H04W 12/106 |
| 11,445,362 | B2* | 9/2022 | Liu ...................... H04W 12/069 |
| 11,685,402 | B2* | 6/2023 | Lee ................... B60W 50/0205 701/27 |
| 2010/0019891 | A1* | 1/2010 | Mudalige ............... G08G 1/167 340/425.5 |
| 2013/0083679 | A1* | 4/2013 | Krishnaswamy ...... G08G 1/093 370/252 |
| 2015/0161830 | A1* | 6/2015 | Lenhardt .............. G01N 27/048 701/30.5 |
| 2018/0122236 | A1* | 5/2018 | Murray ................. H04B 17/12 |
| 2018/0136008 | A1* | 5/2018 | Engel ..................... G08G 1/0112 |
| 2018/0170400 | A1* | 6/2018 | Mahnke ................. G08G 1/017 |
| 2018/0259640 | A1* | 9/2018 | Correia ................. B60W 30/17 |
| 2018/0348781 | A1* | 12/2018 | Zheng ................... G06V 10/774 |
| 2018/0373266 | A1* | 12/2018 | Sethu ...................... H04W 4/46 |
| 2019/0043358 | A1* | 2/2019 | Biehle ............. G08G 1/096791 |
| 2019/0047559 | A1* | 2/2019 | Conde .................... G06V 20/58 |
| 2019/0068582 | A1* | 2/2019 | Kim ....................... G07C 5/008 |
| 2019/0073545 | A1 | 3/2019 | Dolgov et al. |
| 2019/0132709 | A1* | 5/2019 | Graefe ..................... G08G 1/04 |
| 2019/0204853 | A1* | 7/2019 | Miller, Jr. ............ G05D 1/0295 |
| 2019/0263423 | A1* | 8/2019 | Wakabayashi ........ B60W 30/09 |
| 2019/0312738 | A1* | 10/2019 | Barrett .................. H04L 9/3247 |
| 2019/0333381 | A1* | 10/2019 | Shalev-Shwartz ... G05D 1/0253 |
| 2020/0005489 | A1* | 1/2020 | Kroeger .................... G06T 7/85 |
| 2020/0045517 | A1* | 2/2020 | Park ........................ H04W 4/12 |
| 2020/0111362 | A1* | 4/2020 | Sohn ....................... G08G 1/162 |
| 2020/0137580 | A1* | 4/2020 | Yang ................... H04W 12/009 |
| 2020/0280842 | A1* | 9/2020 | Liu ........................ H04L 9/3268 |
| 2020/0319297 | A1* | 10/2020 | Bruns ................... G01S 17/931 |
| 2020/0342760 | A1* | 10/2020 | Vassilovski ............. H04W 4/06 |
| 2021/0125430 | A1* | 4/2021 | Neerukonda ............ G08G 1/04 |
| 2021/0221390 | A1* | 7/2021 | Slobodyanyuk ........ H04W 4/40 |
| 2022/0126863 | A1* | 4/2022 | Moustafa .................. G06T 9/00 |
| 2022/0126864 | A1* | 4/2022 | Moustafa .............. G06T 1/0007 |
| 2022/0161815 | A1* | 5/2022 | Van Beek ........ B60W 60/00274 |
| 2022/0246031 | A1* | 8/2022 | Vijaya Kumar .............................. G08G 1/096741 |
| 2023/0141992 | A1* | 5/2023 | Jeong .................... H04L 9/3268 713/156 |

FOREIGN PATENT DOCUMENTS

| | | | | |
|---|---|---|---|---|
| DE | 102011083039 | A1 | 3/2013 | |
| DE | 102013225563 | A1 | 6/2015 | |
| DE | 102015219933 | A1 * | 11/2016 | ............ G01C 25/00 |
| DE | 102017203838 | A1 | 9/2018 | |
| DE | 102018205322 | A1 | 10/2019 | |
| DE | 102018207658 | A1 * | 11/2019 | .............. G01S 7/40 |
| DE | 102018114515 | A1 | 12/2019 | |
| DE | 102020104357 | A1 * | 9/2020 | .......... H04L 9/3215 |
| JP | 2019530077 | A * | 10/2019 | ............. H04W 4/46 |
| KR | 20180080939 | A * | 7/2018 | .............. G08B 5/36 |
| KR | 20190120105 | A * | 10/2019 | ............ G01C 25/00 |
| WO | 2019197260 | A1 | 10/2019 | |
| WO | WO-2019219419 | A1 * | 11/2019 | .............. G01S 7/40 |
| WO | WO-2020107737 | A1 * | 6/2020 | ....... G08G 1/096791 |

OTHER PUBLICATIONS

DE-102020104357-A1 machine translation (Year: 2020).*
WO-2020107737-A1 machine translation (Year: 2020).*
WO-2019219419-A1 machine translation (Year: 2019).*
DE-102018207658-A1 (Year: 2019).*
JP 2019530077 A (Year: 2019).*
DE-102015219933-A1 (Year: 2016).*
KR-20180080939-A machine translation (Year: 2018).*
ETSI TR 102 893; Intelligent Transport Systems (ITS); Security; Threat, Vulnerability and Risk Analysis (TVRA); Aug. 2019; V1.3.2.
Office Action; Chinese Patent Application No. 202111169506.1; Jul. 24, 2024.

* cited by examiner

VEHICLE, DEVICE, COMPUTER PROGRAM AND METHOD FOR IMPLEMENTATION IN A VEHICLE

PRIORITY CLAIM

This patent application claims priority to German Patent Application No. 10 2020 212 565.1, filed 6 Oct. 2020, the disclosure of which is incorporated herein by reference in its entirety.

SUMMARY

Illustrative embodiments relate to a transportation vehicle, a device, a computer program, and a method to be carried out in a transportation vehicle, particularly, but not exclusively, to a concept for a transportation vehicle for validating environment information from one or more other transportation vehicles.

BRIEF DESCRIPTION OF THE DRAWINGS

Disclosed embodiments are described in more detail below with reference to the drawings, in which:

FIGS. 5a, 5b, 5c and 5d show an exemplary scenario of a communication between transportation vehicles.

DETAILED DESCRIPTION

Figure 1:
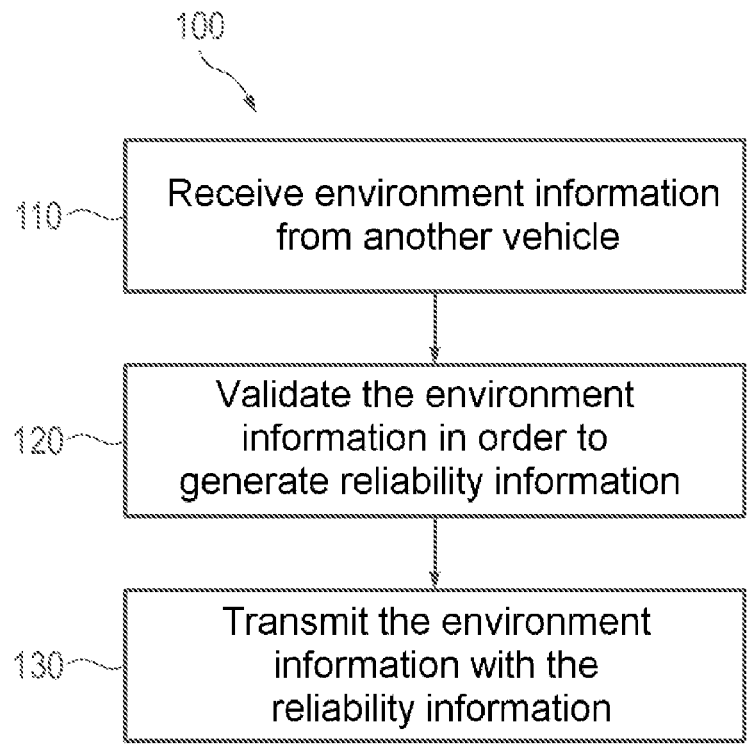
FIG. 1 shows a block diagram of a flow diagram of an exemplary embodiment of a method to be carried out in the transportation vehicle.

Communication between transportation vehicles plays an increasingly important role, particularly in autonomous or partially autonomous vehicles. Communication of messages and notifications helps such transportation vehicles, for example, to be able to identify situations in the environment correctly and/or in a timely manner and to be able to react to them. The communication, messages and notifications can be subject to the risk of misuse, misidentification and unauthorized interventions (e.g., hacking).

Document DE 10 2004 017 602 A1 proposes a method for forming trust in the communication between transportation vehicles in a communication network with direct vehicle-to-vehicle communication. A receiving transportation vehicle receives communication signals from a transmitting transportation vehicle. The receiving transportation vehicle determines trust information or updates trust information, F1, wherein the trust information makes it possible to establish whether data are transmitted by the transmitting transportation vehicle is trusted and/or how trusted data transmitted by the transmitting transportation vehicle are. The receiving transportation vehicle provides the trust information for a further vehicle-to-vehicle communication.

Document DE 10 2011 083 039 A1 relates to a concept for operating a transportation vehicle having a driving assistance system to provide a driving assistance function and a control to control the driving assistance system depending on transportation vehicle environment data and a quality factor assigned to the transportation vehicle environment data. The quality factor is determined by an external control server based on aggregated data from a plurality of other transportation vehicles.

Document DE 10 2013 225 563 A1 relates to a concept for monitoring at least one sensor of a transportation vehicle which has methods or mechanisms for wireless communication. This concept is characterized in that measured values from the at least one sensor are compared with measured values from at least one comparison transportation vehicle using the methods or mechanisms for wireless communication.

Document DE 10 2015 219 933 A1 relates to a concept for checking the plausibility of measured values of a mobile device. This concept provides that a sensor system of the mobile device generates at least one measured value, at least two information elements relating to the at least one measured value are received via a communication service and the plausibility of at least one measured value is checked on the basis of the at least two information elements.

It is clear that the preceding concepts merely offer a verification of a transportation vehicle's own sensor system, but no facility for verifying communication (e.g., comprising messages and notifications) between transportation vehicles.

A need therefore exists for an improved concept for verifying the communication of transportation vehicles. The subject-matter of the attached independent claims meets this need.

Example embodiments are based on the central concept that a transportation vehicle can verify the validity/reliability of environment information that has been received from another transportation vehicle and can return the environment information together with information relating to the validity/reliability to the other transportation vehicle and/or can forward it to one or more further transportation vehicles. This allows transportation vehicles which receive the reliability-related information to assess the credibility of the environment information. An iterative and/or multiple validation of the same environment information by a plurality of transportation vehicles within the fleet or a "swarm" of transportation vehicles allows a higher credibility of the reliability information, as will be explained in more detail later. The concept proposed here can therefore be understood as a "swarm validation" concept.

Example embodiments provide a method to be carried out in a transportation vehicle. The method comprises receiving environment information relating to an environment of the transportation vehicle from another transportation vehicle. The method further comprises validating the environment information to generate reliability information relating to the environment information. The method further comprises transmitting the environment information with the reliability information.

This allows, for example, one or more transportation vehicles which receive the environment information with the reliability information to assess the credibility/validity/plausibility of the environment information on the basis of the reliability information, for example, to regard it as valid or invalid, and to take it into account or ignore it accordingly. Influences due to misidentification or unauthorized influences on a control of the one or more transportation vehicles which receive the reliability information can at least be reduced in this way. Erroneous or incorrect messages/notifications, for example, can be identified in the validation and can be regarded as invalid on the basis of corresponding reliability information from the one or more transportation vehicles. Erroneous or incorrect messages/notifications, for example, are thus taken into account less or are ignored by the one or more transportation vehicles during the control compared with messages/notifications that are regarded as valid. The influence of erroneous or incorrect messages/notifications is at least reduced as a result.

In some example embodiments, the environment information comprises measured data of the environment, interpreted measured data and/or a user input.

According to the method, reliability information relating to the measured data, the interpreted measured data and/or the user input can be generated during the validation and can be transmitted together with the measured data, the interpreted measured data and/or the user input. This allows the one or more transportation vehicles to assess the measured data, the interpreted measured data and/or the user input on the basis of the reliability information also.

In some example embodiments, the environment information with the reliability information is embedded in a message with control information and payload. The environment information can be assigned to the payload and the reliability information to the control information. The control information can have an identifier assigned to the message.

The identifier allows an identification and assignment of the message. Particularly if the method proposed herein is used in a plurality of transportation vehicles in a fleet, it is thereby possible to prevent a transportation vehicle in the fleet from validating the environment information multiple times and/or more often than is required.

In some example embodiments, the validation comprises comparing the environment information with sensor data from at least one sensor of the transportation vehicle and/or validating the environment information on the basis of a user input.

The transportation vehicle is, for example, equipped with the sensor during manufacture for autonomous driving. The sensor data can be compared mechanically with the environment information for the validation. A result of the validation, for example, the reliability information, can be dependent on deviations of the sensor data from the environment information. The validation using the sensor data can be performed mechanically. The validation by the sensor data thus allows, for example, a validation of the environment information automatically or mechanically.

In some disclosed embodiments, the method further comprises receiving information relating to a sensor type of at least one sensor with which the environment information was determined by the other transportation vehicle, and selecting a different sensor type based on the information relating to the sensor type to compare the environment information with the sensor data from the different sensor type.

An influence of systematic measurement inaccuracies of the one or other sensor type on the validation can at least be reduced as a result. As the person skilled in the art will understand, the reliability/credibility of the validation can be increased as a result.

In some disclosed embodiments, receiving environment information comprises receiving first reliability information relating to the environment information from another transportation vehicle, validating the environment information, generating second reliability information on the basis of the first reliability information, and transmitting the environment information with the reliability information and transmitting the second reliability information.

According to the method proposed here, the first reliability information is, for example, generated and transmitted by the other transportation vehicle. The second reliability information which is based on a number of validations, can have a higher credibility or trustworthiness than reliability information which is based on a smaller number of validations. The second reliability information has, for example, a higher credibility than the first reliability information. By a number/plurality of validations, an abusive intervention in the communication between transportation vehicles can be detected with a higher probability and can be classified as invalid on the basis of the reliability information resulting from the number of validations.

Further example embodiments provide a method for a transportation vehicle. The method comprises receiving environment information relating to an environment of the transportation vehicle. The method further comprises transmitting the environment information to at least one other transportation vehicle for the validation of the environment information by the other transportation vehicle, and generating reliability information relating to the environment information. The method further comprises receiving the reliability information from the other transportation vehicle.

The reliability information can be understood as feedback from the other transportation vehicle on the environment information. This allows the transportation vehicle to assess the credibility of the environment information received from the other transportation vehicle on the basis of the reliability information. Depending on the reliability or credibility of the environment information, the environment information can influence a control of the transportation vehicle or can be ignored by the transportation vehicle. This allows, for example, an influence of unauthorized interventions in the communication between transportation vehicles, for example, by circulating incorrect environment information, at least to be reduced.

Further example embodiments provide a computer program having a program code to carry out one of the methods proposed herein when the program code is executed on a computer, a processor, a data processing circuit, a control module or a programmable hardware component.

Further example embodiments provide a device for a transportation vehicle. The device comprises one or more interfaces for communication and a data processing circuit to carry out one of the methods proposed herein.

Further example embodiments provide a transportation vehicle comprising the device proposed herein.

Different example embodiments will now be described herein in more detail with reference to the attached drawings, in which a number of example embodiments are shown. Optional features or components are indicated by broken lines.

Although example embodiments may be modified and adapted in different ways, example embodiments in the figures are presented as examples and are described in detail herein. However, it should be made clear that there is no intention to limit example embodiments to the respectively disclosed forms, but rather that example embodiments are intended to cover all functional and/or structural modifications, equivalents and alternatives that fall within the scope of the disclosure.

It should be noted that an element that is designated as "connected" or "coupled" to another element may be directly connected or coupled to the other element or that intermediate elements may be present. On the other hand, if an element is designated as "directly connected" or "directly coupled" to another element, no intermediate elements are present. Other terms that are used to describe the relationship between elements should be interpreted in a similar manner (e.g., "between" as opposed to "directly between", "adjacent" as opposed to "directly adjacent", etc.).

The terminology used herein serves only to describe specific example embodiments and is not intended to limit the example embodiments. As used herein, the singular forms "a", "an" and "the" are also intended to include the plural forms, unless the context clearly indicates otherwise. It should furthermore be made clear that expressions such as "contains", "containing", "has" and/or "having", "comprises" and/or "comprising", as used herein, indicate the existence of specified features, integers, workflows, elements and/or components, but do not exclude the presence or the addition of one or more features, integers, workflows, elements, components and/or groups thereof.

FIG. 1 shows a block diagram of a flow diagram of one example embodiment of a method 100 to be carried out in the transportation vehicle. The method 100 comprises receiving 110 environment information relating to an environment of the transportation vehicle from another transportation vehicle. The method 100 further comprises validating 120 the environment information to generate reliability information relating to the environment information. In addition, the method 100 further comprises transmitting 130 the environment information with the reliability information.

The method 100 allows one or more transportation vehicles which receive the environment information transmitted with the reliability information to assess the credibility of the environment information based on the reliability information. As will be explained in more detail below, unwanted influences of erroneous communicated environment information can thereby be reduced.

The environment information comprises information relating to a situation in the environment of the transportation vehicle. The environment information comprises, for example, one or more information elements relating to wrong-way drivers, accidents, broken down transportation vehicles, roadworks, persons on the carriageway, an obstacle, fire, weather events (slipperiness/friction value, fog, storm, etc.), carriageway flooding, aquaplaning and/or the like.

In particular, the environment information can comprise measurement data of the environment and/or interpreted measurement data. The measurement data are, for example, sensor data which are recorded and transmitted by one or more sensors or a sensor system of another transportation vehicle and/or an infrastructure. Examples of such sensors are lidar sensors, radar sensors, time-of-flight (TOF) cameras, image and/or video cameras. The measurement data can accordingly contain image data, referred to as a "point cloud", and/or distance values to one or more objects in the environment. The interpreted measurement data contain, for example, information relating to objects and/or a situation in the environment obtained from such "raw" measurement data through further processing and/or interpretation. The interpreted measurement data contain, for example, information relating to a position, a shape, a speed, an acceleration, a size, a trajectory and/or the like of objects, road users and/or transportation vehicles. The interpreted measurement data comprise, for example, a cooperative awareness message (CAM), a collective perception message (CPM), a decentralized environmental notification message (DENM), a signal phase and timing (SPaT) and/or a message with information relating to hazards, objects, the situation, the weather and/or a road characteristic in the environment.

The environment information can optionally comprise at least one user input. The user input comprises, for example, information relating to a control command (for example, a steering angle, an actuation of a pedal, a voice input, an input relating to an operating panel and/or the like). The user input can refer to a specific situation in the environment. A full brake application by a driver indicates, for example, a hazardous situation. Such an interpretation of a direct user input, as in this case the full brake application, can also be understood as a user input.

As the person skilled in the art will understand, a transmitting of the environment information by the other transportation vehicle and the receiving 110 of the environment information can be performed by different concepts and corresponding methods or mechanisms for communication between transportation vehicles. The communication (the transmitting and receiving 110) takes place, for example, via vehicle-to-vehicle (V2V) or car-to-car (C2C) communication, vehicle-to-infrastructure (V2I) or car-to-infrastructure (C2I) communication, vehicle-to-anything (V2X) or car-to-anything (C2X) communication. Corresponding methods or mechanisms for receiving 110 comprise, for example, an interface for dedicated short-range communication (DSRC) and/or for communication via the mobile radiocommunication network (for example, a 3rd Generation Partnership Project (3GPP) interface, such as a PC5 interface).

The validation 120 of the environment information can be understood as a verification of the reliability, plausibility or credibility of the environment information.

The validation 120 comprises, for example, comparing the environment information with sensor data from at least one sensor of the transportation vehicle and/or validating the environment information on the basis of a user input.

The transportation vehicle can optionally be equipped with a plurality of sensors. The sensor data can accordingly contain measurement data from a plurality of sensors. The transportation vehicle can be equipped with the at least one sensor during manufacture for autonomous driving, the sensor serving, for example, to monitor the environment for autonomous driving. The sensor data can accordingly be data which serve to monitor the environment for autonomous driving. The one or more sensors comprise, for example, a lidar sensor, a radar sensor, a TOF camera, an image camera, a video camera, an ultrasound sensor and/or the like. The one or more sensors optionally comprise at least one rain sensor, a temperature sensor, a tire rotational speed sensor, a G-force sensor, a sensor of an anti-lock brake system (ABS), a sensor of an airbag and/or the like. The sensor data can accordingly contain information relating to the weather and/or the road characteristic in the environment and/or relating to a speed and/or an acceleration of the transportation vehicle. The sensor data can optionally be processed and/or interpreted for a better comparability with the environment information. The environment information can optionally be processed and/or interpreted for a better comparability with the sensor data. The validation 120 provides, for example, a comparison of shapes, sizes and/or positions for the same object in the environment derived from the sensor data and the environment information. A simpler plausibility check can be carried out before the validation by the sensor data. Sensor data which indicate an implausible situation (e.g., a wrong-way driver on carriageways that are not structurally separated) can be disqualified for the validation and only plausible sensor data can be used for the validation. Map data of a navigation system, for example, can be used as a basis for a plausibility check of this type. A result of a plausibility check of this type can optionally be used as an input parameter for the validation with the sensor data, e.g., as a weighting and/or to adjust threshold values.

The user input for validating the environment information comprises, for example, information relating to a control command (for example, a steering angle, an actuation of a pedal, a voice input, an input relating to an operating panel and/or the like). The user input can refer to a specific situation in the environment. A braking by a driver of the transportation vehicle indicates, for example, an imminent obstacle or a transportation vehicle driving in front. The user input optionally comprises an input in response to a query and/or a (visual) representation of the environment information. The environment information indicates, for example, that a transportation vehicle driving in front is slowing down. The environment information relating to the transportation vehicle driving in front is confirmed or refuted, for example, depending on an actuation of a brake of the transportation vehicle and/or through an input in response to a query addressed to an occupant of the transportation vehicle concerning whether the transportation vehicle driving in front is slowing down.

Information determined by and received from a traffic infrastructure can optionally be used to validate the environment information. Such traffic infrastructure comprises, for example, networked traffic control systems or elements (e.g., traffic lights) equipped for communication via V2V, V2I, V2X, DSRC and/or 3GPP. A multiple performance of the validation using information which has been received from traffic infrastructure elements allows a determination of a quota with which the environment information has been assessed as valid or as invalid during the validation with this information. This quota can be used in subsequent validations by this traffic infrastructure element as a weighting of the information received from this infrastructure element. The weighting allows an assessment of the credibility of the subsequent validations by this traffic infrastructure element.

Information (e.g., weather data or satellite images) from further data sources (e.g., weather stations, Internet) can optionally be used for the validation.

The environment information can optionally be validated using other communicated environment information which has been received by the transportation vehicle at a different time, at a different location and/or in the same weather conditions. The environment information can be compared, for example, with other environment information of this type for the validation. Artificial intelligence, for example, as a neural network trained with a plurality of environment information elements as training data can be used for a comparison of this type.

The reliability information is generated, for example, according to a result of the validation. The reliability information can be understood as a measure of the accuracy and/or the credibility/validity/plausibility of the environment information. The reliability information comprises, for example, a (unitless) numerical value, a validity counter, a binary value (e.g., with the possible states: valid and invalid), a probability value and/or an error value to indicate the credibility/validity/plausibility and/or the accuracy or inaccuracy of the environment information. The environment information can be classified by the one or more transportation vehicles which receive the reliability information on the basis of the binary value or a threshold value comparison of the error value, the probability value, the validity counter and/or the numerical value. A classification of the credibility/validity/plausibility of the environment information in the reliability information has, for example, at least the following classes: invalid and valid. The classification can optionally have further gradations or weightings.

The transportation vehicle can itself respond to the environment information. A response of the transportation vehicle can depend on a result of the validation. The environment information is, for example, displayed for a user of the transportation vehicle only if it is regarded as valid and/or results in driving interventions based on the environment information only if it is regarded as valid.

The transmitting 130 of the environment information with the reliability information takes place, for example, via at least one of the aforementioned concepts (V2V, V2I, V2X, DSRC, 3GPP) for communication between transportation vehicles and corresponding methods or mechanisms/interfaces of this concept or these concepts. This allows the environment information to be provided together with the reliability information for one or more other transportation vehicles for the assessment of the environment information based on the reliability information by the one or more other transportation vehicles. The one or more other transportation vehicles can include the (other) transportation vehicle from which the environment information originates. In this way, this transportation vehicle obtains feedback on the environment information which is useful, for example, for a sensor calibration and/or sensor validation.

The environment information is transmitted, for example, together with the reliability information into a common data structure to simplify an assignment of the reliability information to the environment information by transportation vehicles which receive the environment information with the reliability information. Furthermore, as the person skilled in the art will understand, utilization of a communication path via which the environment information and the reliability information are communicated can thereby be reduced.

The transmitting 130 can be dependent on the validation 120 of the environment information and can take place, for example, only if the environment information is classified as valid on the basis of the validation and/or the reliability information 120. As the person skilled in the art will understand, this offers the benefit that a dissemination of incorrect, erroneous and/or invalid environment information can thereby be prevented. A digital key, for example, which is required to forward the environment information is obtained from an external server/backend only if the environment information is classified as valid on the basis of the validation and/or the reliability information 120. The dissemination of unverified messages can thus be technically prevented and misuse and/or hacking can be avoided.

The method 100 enables the vehicles/receiver vehicles which receive the environment information with the reliability information to assess the accuracy and/or the credibility/validity/plausibility of the environment information on the basis of the reliability information. The environment information is taken into account, for example, according to a weighting based on the reliability information during a control of the receiver vehicles. The method 100 allows the receiver vehicles, for example, to weight environment information regarded as credible/valid/plausible more heavily than environment information that is regarded as not credible/valid/plausible, such as, for example, incorrect or erroneous messages/notifications. An unwanted influence of these messages/notifications can be reduced in this way.

The method 100 optionally comprises receiving information relating to a sensor type of at least one sensor with which the environment information has been determined by the other transportation vehicle. The method 100 can further comprise selecting a different sensor type on the basis of the information relating to the sensor type for comparing the environment information with the sensor data of the different sensor type.

An influence of systematic measurement inaccuracies of the one or other sensor type on the validation can at least be reduced as a result. The reliability of the validation can thus be increased.

The information relating to the sensor type is received, for example, by the already mentioned concepts (V2V, V2I, V2X, DSRC, 3GPP) and corresponding methods or mechanisms/interfaces. The information relating to the sensor type may be received via the same interface that is used to receive the environment information.

It should be noted that the method 100 can optionally be carried out iteratively and/or for environment information from a plurality of other transportation vehicles. As will be explained in detail below, this allows, for example, a cumulative value for the reliability information through a plurality of consecutive validations of the environment information and a generation of a based on the plurality of validations.

The method proposed herein is carried out, for example, by a device fitted to the transportation vehicle.

Figure 2:
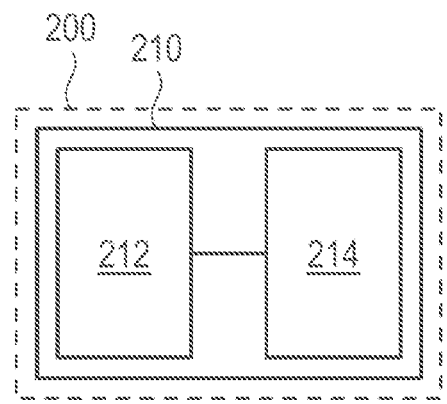
FIG. 2 shows a block diagram of an exemplary embodiment of a device for a transportation vehicle.

FIG. 2 shows a block diagram of an example embodiment of a device 210 for a transportation vehicle 200.

The device 210 comprises one or more interfaces 212 for communication. The device 210 further comprises a data processing circuit 214 to carry out the method 100.

To carry out the method 100, the data processing circuit 214 can receive the environment information relating to an environment of the transportation vehicle 200 from another transportation vehicle via the one or more interfaces 212. According to the method, the data processing circuit 214 can further validate the environment information to generate reliability information relating to the environment information, as described above, for example, by sensor data and/or the user input. The data processing circuit 214 can further transmit the environment information with the reliability information via the one or more interfaces 212.

In example embodiments, the one or more interfaces 212 of the device 210 comprise contacts to the data processing circuit 214. In example embodiments, they can also be designed as separate hardware. They can comprise memories which at least temporarily store the signals to be transmitted or the received signals. The one or more interfaces 212 can be designed, for example, as a bus interface or as an optical interface to receive electrical signals. In example embodiments, they can additionally be designed for radio transmission and can comprise a radio frontend and associated antennas. The one or more interfaces 212, for example, for the CAN bus (CAN=Controller Area Network), can further comprise synchronization mechanisms for synchronization with the respective transmission medium. In example embodiments, the one or more interfaces 212 can be designed to communicate with other transportation vehicles for receiving 110 and transmitting 130 via V2V, V2I, V2X, DSRC and/or 3GPP. The one or more interfaces 212 can further comprise at least one interface to a sensor of the transportation vehicle 200 to allow the data processing circuit 214 to receive sensor data from the sensor for validation.

In example embodiments, the data processing circuit 214 can be hardware which is designed to carry out one of the methods described herein. This can comprise any processor cores, such as digital signal processor cores (DSPs) or other processors. Example embodiments are not restricted to a specific type of processor core. Any processor cores or a plurality of processor cores or microcontrollers are conceivable for the implementation of the data processing circuit 214. Implementations in integrated form with other devices are also conceivable, for example, in a control unit for a transportation vehicle which additionally comprises one or more other functions also. In example embodiments, the data processing circuit 214 can be implemented by a processor core, a computer processor core (CPU=central processing unit), a graphics processor core (GPU=graphics processing unit), an application-specific integrated circuit (ASIC), an integrated circuit (IC), a system on chip (SoC), a programmable logic element or a field programmable gate array (FPGA) as the core of the aforementioned module or modules. The data processing circuit 214 can thus correspond to any component which can receive the environment information mechanically, validate it to generate the reliability information, and transmit it with the reliability information.

Figure 3:
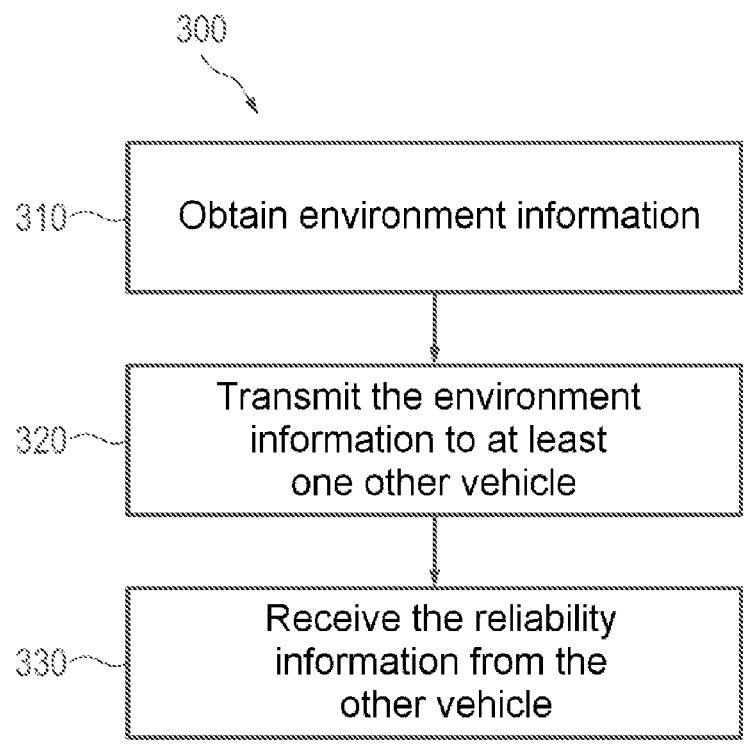
FIG. 3 shows a block diagram of a flow diagram of an exemplary embodiment of a method for a transportation vehicle.

As described above, the environment information can be received with the reliability information, in particular by the transportation vehicle from which the environment information was transmitted for validation or which transmitted the environment information for validation. FIG. 3 shows a block diagram of a flow diagram of an example embodiment of a method 300 for such a transportation vehicle.

The method 300 comprises receiving 310 environment information relating to an environment of the transportation vehicle. The method 300 further comprises transmitting 320 the environment information to at least one other transportation vehicle for the validation of the environment information by the other transportation vehicle, and generating reliability information relating to the environment information. The method 300 further comprises receiving 330 the reliability information from the other transportation vehicle. The transportation vehicle can optionally further receive the environment information from the other transportation vehicle.

The obtaining 310 of the environment information relating to the environment of the transportation vehicle comprises, for example, a sensor-based capture of the environment information relating to the environment by one or more sensors (comprising, e.g., a lidar sensor, a radar sensor, a TOF camera, an image camera, a video camera, an ultrasound sensor, a rain sensor, a temperature sensor, a tire rotational speed sensor, a G-force sensor, a sensor of an anti-lock brake system (ABS) and/or the like). Alternatively or additionally, the obtaining 310 comprises receiving the environment information. The transportation vehicle can receive the environment information from one or more other transportation vehicles and/or a traffic infrastructure, for example, by at least one of the concepts described herein (V2V, V2I, V2X, DSRC, 3GPP) and corresponding methods or mechanisms/interfaces.

The transmitting 320 and receiving 330 of the environment information or the reliability information are implemented, for example, in each case using at least one of these concepts (V2V, V2I, V2X, DSRC, 3GPP). The validation is performed, for example, as explained in connection with the method 100 on the at least one other transportation vehicle which receives the environment information for validation.

As already explained in connection with the method 100, the received reliability information allows the transportation vehicle which receives the reliability information to assess the credibility/validity/plausibility of the environment information on the basis of the reliability information. The reliability information further allows the transportation vehicle to perform a sensor validation of the one or more sensors with which the environment information was determined.

The method 300 optionally comprises transmitting information relating to a sensor type of at least one sensor with which the environment information was determined by the other transportation vehicle. This allows the other transportation vehicle to select a different sensor type on the basis of the information relating to the sensor type to validate/compare the environment information with the sensor data of the different sensor type.

It should be noted that the method 300 can optionally be carried out iteratively, multiple times, through interaction with a plurality of other transportation vehicles and/or for further environment information.

The method 300 proposed herein is carried out, for example, by a device fitted to the transportation vehicle.

Figure 4:
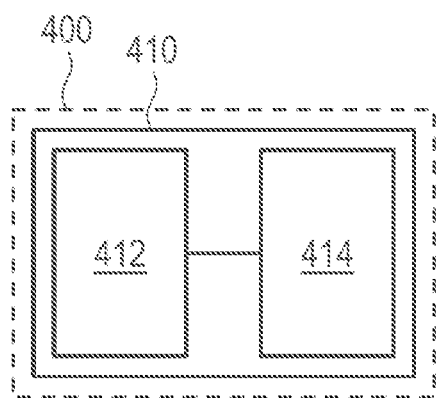
FIG. 4 shows a block diagram of an exemplary embodiment of a device for a transportation vehicle.

FIG. 4 shows a block diagram of an example embodiment of a device 410 for a transportation vehicle 400.

The device 410 comprises one or more interfaces 412 for communication. The device 410 further comprises a data processing circuit 414 to carry out the method 300.

To carry out the method 300, the data processing circuit 414 can obtain environment information relating to an environment of the transportation vehicle via the one or more interfaces 412. The data processing circuit 414 can further transmit the environment information via the one or more interfaces 412 to the at least one other transportation vehicle for validation and can receive the reliability information from the at least one other transportation vehicle.

In example embodiments, the one or more interfaces 412 of the device 410 comprise contacts to the data processing circuit 414. In example embodiments, they can be designed as separate hardware. They can comprise memories which at least temporarily store the signals to be transmitted or the received signals. The one or more interfaces 412 can be designed, for example, as a bus interface or as an optical interface to receive electrical signals. In example embodiments, they can additionally be designed for radio transmission and can comprise a radio frontend and associated antennas. The one or more interfaces 412, for example, for the CAN bus (CAN=Controller Area Network), can further comprise synchronization mechanisms for synchronization with the respective transmission medium. In example embodiments, the one or more interfaces 412 can be designed to communicate with other transportation vehicles for transmitting 320 and receiving 330 via V2V, V2I, V2X, DSRC and/or 3GPP.

In example embodiments, the data processing circuit 414 can be hardware which is designed to carry out one of the methods described herein. The hardware can comprise any processor cores, such as digital signal processor cores (DSPs) or other processors. Example embodiments are not restricted to a specific type of processor core. Any processor cores or a plurality of processor cores or microcontrollers are conceivable for the implementation of the data processing circuit 414. Implementations in integrated form with other devices are also conceivable, for example, in a control unit for a transportation vehicle which additionally comprises one or more other functions also. In example embodiments, the data processing circuit 414 can be implemented by a processor core, a computer processor core (CPU=central processing unit), a graphics processor core (GPU=graphics processing unit), an application-specific integrated circuit (ASIC), an integrated circuit (IC), a system on chip (SoC), a programmable logic element or a field programmable gate array (FPGA) as a core of the aforementioned module or modules. The data processing circuit 414 can thus correspond to any component which can obtain the environment information mechanically, transmit it for validation and receive the reliability information.

In other words, the explained methods 100 and 300 and devices 200 and 400 provide a concept for validating state, object or situation detection in networked traffic. The methods 100 and 300 and the device 200 and 400 can interwork in some application examples. In specific application examples of the concept, a message/notification (environment information) transmitted by a transportation vehicle relating to a specific situation can be validated by a sensor system and/or user inputs of one or more other transportation vehicles in the networked traffic before it is used within the networked traffic to control, for example, to determine, driving interventions. In networked traffic, it is possible to distinguish on the basis of a presence of the reliability information whether a notification is still to be validated or has already been validated. According to the concept proposed herein, along with notifications of the transportation vehicles with environment information, reliability information relating to the reliability of the environment information can be made available to transportation vehicles in the networked traffic and possibly to a server/backend connected to the transportation vehicles. A notification not yet validated can first be verified by a sensor system of the transportation vehicle receiving the notification or by the user input query before a driving intervention takes place. If a confirmation is provided, the notification can be further distributed as verified so that other transportation vehicles can respond to it without prior validation of the environment information. The concept can protect against misidentification of hazardous situations and also against deliberate malicious/unwanted interventions in the networked traffic, for example, by corrupt data.

FIGS. 5a, 5b, 5c and 5d show an example scenario of a communication between transportation vehicles on the basis of which an application example of the methods 100 and 300, and also the devices 210 and 410, is to be described in detail.

Figure 5A:
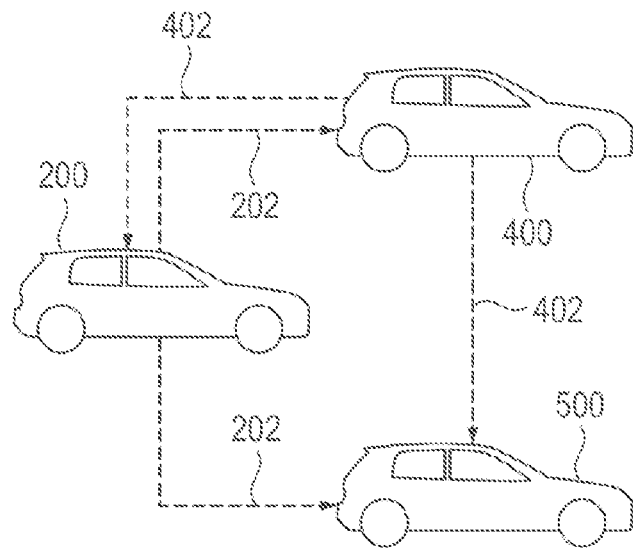

FIG. 5a shows schematically the transportation vehicle 200, the transportation vehicle 400 and a transportation vehicle 500.

If, for example, a specific situation is detected by the transportation vehicle 400, the transportation vehicle 400 transmits the environment information by the device 410 according to the method 300. The transportation vehicle 400 transmits the environment information, for example, embedded in a data structure, in this case a message 402, with control information and payload to the transportation vehicle 200 and the transportation vehicle 500. The environment information can be assigned to the payload. The environment information and the payload can therefore be understood as synonymous for a description of subsequent example embodiments. However, it should be noted that the payload can contain additional information along with the environment information. The message can be designed as a bit sequence. The control information and the payload differ, for example, in terms of their position within the bit sequence.

The transportation vehicle 200, along with the transportation vehicle 500, receives the environment information with the message 402 using the device 210 according to the method 100 and validates the environment information to generate the reliability information. During the validation, the transportation vehicle 200 verifies, for example, the environment information in the message 402 which indicates, for example: "Wrong-way driver detected". The environment information relating to the wrong-way driver can be confirmed or refuted by a sensor system and/or a query to a driver or front-seat passenger of the transportation vehicle 200.

The transportation vehicle 200 further transmits the environment information with the reliability information according to the method. The transportation vehicle 200, for example, transmits the environment information and the reliability information embedded together in a message 202 to the transportation vehicle 400 and the transportation vehicle 500. The message 202 similarly has, for example, control information and payload. Reliability information can be assigned to the control information, and the environment information can be assigned to the payload.

The transportation vehicles 400 and 500 can assess whether the environment information "Wrong-way driver detected" is valid or not on the basis of the reliability information in the message 202. Depending on information relating to the credibility/validity/plausibility of this environment information in the reliability information, the transportation vehicles 400 and/or 500 can assess the credibility/validity/plausibility on the basis of the reliability information and can take account of the environment information accordingly in a weighted manner during the control of the transportation vehicles 400 and/or 500. In the validation, the transportation vehicle 200 confirms, for example, the information "Wrong-way driver detected". The reliability information indicates accordingly that the information is valid. Transportation vehicles 400 and 500 therefore assess the environment information "Wrong-way driver detected" on the basis of the reliability information, for example, as valid. Driving interventions, such as, for example, braking and/or evasive maneuvers, can be performed accordingly in the transportation vehicles 400 and 500 on the basis of the environment information assessed as valid. If the environment information "Wrong-way driver detected" is refuted during the validation and the transportation vehicles 400 and 500 assess the environment information "Wrong-way driver detected" as invalid on the basis of the corresponding reliability information, driving interventions in response to the environment information "Wrong-way driver detected" can be foregone.

The control information of the messages 202 and 402 can in each case have an identifier. As the person skilled in the art will understand, unwanted multiple validation of the environment information by the same transportation vehicle can be prevented, taking account of the identifier.

In particular, the messages 202 and 402 can have the same identifier, for example, if the transportation vehicle 200 adopts the identifier of the message 402 for the message 202 or adds the reliability information to the message 202 to generate the message 402. The same identifier allows a greater efficiency in the reading of the messages 202 and 402. If, for example, the transportation vehicle 400 and the transportation vehicle 500 establish that the messages 202 and 402 have the same identifier, they can read only the control information comprising the reliability information from the message 202, and only the payload from the message 402. This avoids having to read, for example, the entire message 202 and the entire message 402.

Figure 5B:
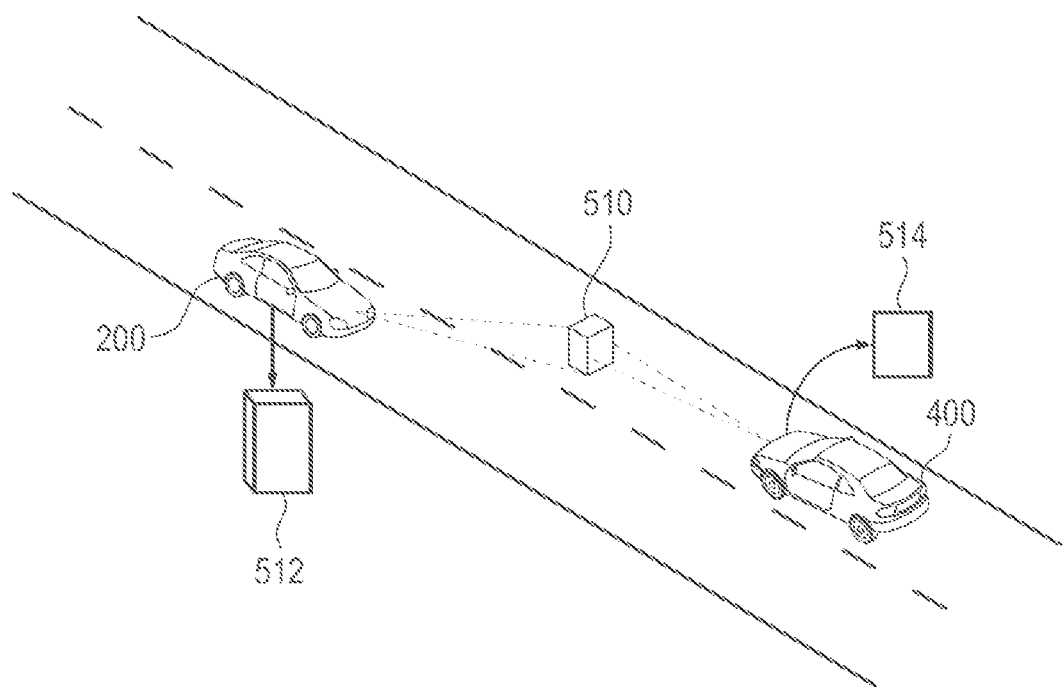

As shown in FIG. 5b, the environment information can contain information relating to an object 510 in the environment and the environment information can be validated, for example, on the basis of sensor data relating to the object 510 which have been captured by the transportation vehicle 200. The object is, for example, a moving object (for example, a transportation vehicle or a pedestrian) or a stationary object (for example, an obstacle). In particular, a relative position of the transportation vehicles 200 and 400 can be taken into account in the validation. In the present example, the environment information indicates, for example, a shape 514 detected by the sensors of the transportation vehicle 400, and the sensor data, due to their relative position and therefore different perspectives of the transportation vehicles 200 and 400 indicate a shape 512 of the object 510 which differs from the shape 514. For the validation, it is possible to verify whether it is plausible that the shapes 512 and 514 represent the same object, in this case the object 510, taking account of the different perspectives of the transportation vehicles 200 and 400. As the person skilled in the art will understand, this can be verified mechanically and, for example, on the basis of identical features in the sensor data and the environment information, and/or by applying a coordinate transformation to the sensor data and/or the environment information. The following, for example, can therefore be considered: the transportation vehicle 400 reports the object 510 with the shape 514 and a first position (relative to the transportation vehicle 400) via the environment information. It is then possible to determine, for example, by applying a coordinate transformation, the shape in which and the distance at which the same object 510 would have to be detected by the transportation vehicle 200 and compared, for example, with the shape 512. The sensor data from 200 can be retrieved and evaluated. It is thereby determined, for example, whether an object detection by the transportation vehicle 400 is valid. To enable such a validation or the coordinate transformation, the transportation vehicle 400 can transmit its own position to the transportation vehicle 200 with the environment information.

In some cases, along with the environment information, the transportation vehicle 200 can further receive first reliability information relating to the environment information from another transportation vehicle, such as, for example, the transportation vehicle 400 or 500. This is the case, for example, if the environment information has been validated by a transportation vehicle other than the transportation vehicle 200. In such cases, validating the environment information can comprise generating second reliability information based on the first reliability information and transmitting the second reliability information.

The first reliability information is, for example, embedded in the message 402. To generate the message 202, the transportation vehicle 200, for example, adopts the message 402 and changes the first reliability information into the second reliability information.

Figures 5C, 5D:
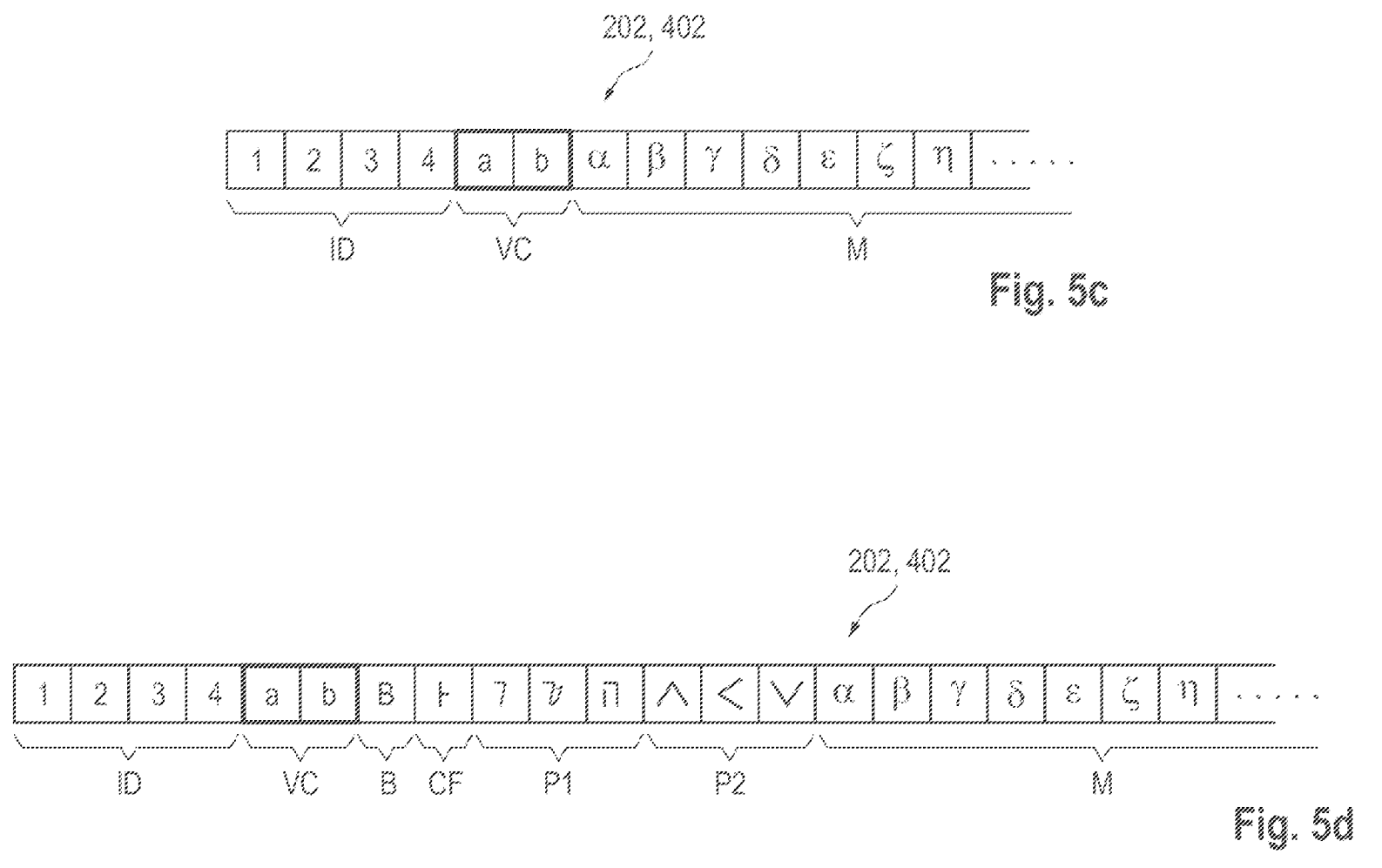

FIG. 5c shows, by way of example, a possible format for the messages 202 and 402.

As can be seen from FIG. 5c, the messages 202 and 402 are designed as a bit sequence and contain, for example, an identifier ID, a validity counter VC and payload M. The validity counter VC represents, for example, the reliability information. The identifier ID, the validity counter VC and the payload M can have different positions within the bit sequence. The identifier ID is located, for example, in front of the validity counter VC within the bit sequence. The validity counter VC is followed within the bit sequence by the payload M. The communication between the transportation vehicles 200, 400 and 500 will be presented below with reference to FIG. 5a on the basis of an example:

The message 402 has, for example, the identifier ID:"1234" and is transmitted by the transportation vehicle 400 with the validity counter VC equals "00". This validity counter VC indicates, for example, that the environment information in the payload M is not yet validated, and can be regarded as first reliability information. Following the validation by the transportation vehicle 200, the transportation vehicle 200 adopts the message 402 with the unchanged identifier "1234" and the payload M to generate the message 202, and, if it was possible to confirm the credibility/validity/plausibility or the environment information in the validation, changes to VC equals "01" and transmits the message 402 to the transportation vehicles 400 and 500. If the environment information is refuted, the validity counter is reduced by 1. The "new" validity counter VC equals "01" can be regarded as the second reliability information. Transportation vehicles, such as, for example, the transportation vehicle 500, which have already received and decoded the message 402 must only receive and decode the part of the message 202 up to the validity counter VC and can assume the remainder of the message 202 and the payload M of the message 402 which the transportation vehicle 500 has already received as validated.

Within a fleet of a plurality of transportation vehicles, this method can be carried out multiple times, for example, on a plurality of transportation vehicles. The environment information can be forwarded successively to a plurality of transportation vehicles as the payload M of further messages with the same identifier ID. Further validations of the environment information can be performed on the plurality of transportation vehicles and further changes can thereby be made to the validity counter VC. The more transportation vehicles there are that validate and forward the payload M, the higher the validity counter VC can increase. Before the payload M is forwarded, for example, the highest counter value hitherto received is changed (incremented or reduced) by one. It should be noted that, in some example embodiments, the validity counter VC can be changed by different values depending on the reliability of the validation. A validation of the environment information by a user, for example, can result in a change in the counter value by 10, a validation of the environment information by sensor data from a plurality of sensors can result in a change in the validity counter VC by 5, and a validation by sensor data from a single sensor can result in a change in the validity counter VC by 1.

It should be noted that, in some example embodiments, the validity counter can be changed in a different manner depending on the result of the validation.

As shown in FIG. 5d, the messages 202 and 402 can have a different format. The format shown in FIG. 5d has, for example, a bit sequence which, along with the identifier ID, within the bit sequence between the validity counter VC and the payload M, comprises information B relating to a validation of the environment information or the payload M by an external server/backend connected to the transportation vehicle 200 and/or 400, information CF ("ChangeFlag") relating to a subsequent change to the payload M, information P1 relating to a position of a sensor by which the environment information was generated, and information P2 relating to a position of one or more objects for which information is contained in the environment information, for example, the object 510.

The information CF is inserted, for example, if, following a validation, the environment information is adjusted and/or more precisely defined within a predetermined tolerance. If the information CF indicates that the environment information has been adjusted, a further validation may be appropriate.

Along with the validity counter VC, the information B serves as an additional measure of the credibility/validity/plausibility of the environment information or the payload M.

The information B allows a backend functionality to be used in dense traffic for the networked transportation vehicles, for example, the transportation vehicles 200, 400 and 500, even if an available online data bandwidth for a connection to the backend is sufficient for only one or a small number of transportation vehicles.

The information P1 and P2 allows, for example, a determination of a relative position of the sensor by which the environment information was generated. The information P1 and P2 thereby further allows, for example, a determination of the position of the transportation vehicles 200 and 400 relative to one another for the validation of the environment information, taking account of the relative position, as already explained above.

Example embodiments can additionally be or relate to a computer program having a program code to carry out one or more of the above methods when the computer program is executed on a computer or processor. Operations or processes of different methods described above can be carried out by programmed computers or processes. Examples can also cover program memory devices, e.g., digital data storage media, which are machine-readable, processor-readable or computer-readable, and which code machine-executable, processor-executable or computer-executable programs of instructions. The instructions execute some or all of the operations of the methods described above or instigate their execution. The program memory devices can be or comprise, e.g., digital memories, magnetic storage media, such as, for example, magnetic disks and magnetic tapes, hard drives or optically readable digital data storage media. Further examples can also cover computers, processors or control units which are programmed to execute the operations of the methods described above, or (field) programmable logic arrays ((F)PLAs) or (field) programmable gate arrays ((F)PGAs) which are programmed to execute the operations of the methods described above.

Functions of different elements shown in the figures and the designated function blocks can be implemented as dedicated hardware, e.g., "a signal provider", "a signal processing unit", "a processor", "a control", etc., and as hardware capable of executing software in conjunction with associated software. In the case of provision by a processor, the functions can be provided by a single dedicated processor, by a single commonly used processor or by a plurality of individual processors, some of which or all of which can be commonly used. However, the term "processor" or "control" is in no way limited to hardware capable exclusively of executing software, but can comprise a digital signal processor (DSP) hardware, a network processor, an application-specific integrated circuit (ASIC), a field programmable gate array (FPGA), a read-only memory (ROM) for storing software, a random access memory (RAM) and a non-volatile storage device. Other hardware, conventional and/or customer-specific, can also be included.

A block diagram can represent, for example, a rough circuit diagram which implements the principles of the disclosure. A flow diagram, a process diagram, a state transition diagram, a pseudocode and the like can similarly represent different processes or operations which are essentially represented, for example, in a computer-readable medium and are thus executed by a computer or processor, regardless of whether such a computer or processor is explicitly shown. Methods disclosed in the description or in the patent claims can be implemented by a component which has a method or mechanism for executing any of the respective operations of these methods.

It goes without saying that the disclosure of a plurality of processes, operations or functions set out in the description or the claims is not intended to be understood to mean that they take place in the defined sequence, unless this is explicitly or implicitly otherwise indicated, e.g., for technical reasons. They are not therefore limited by the disclosure of a plurality of operations or functions to a defined sequence, unless these operations or functions are not interchangeable for technical reasons. Moreover, in some examples, a single function, process or operation can include and/or can be subdivided into a plurality of subfunctions, subprocesses or suboperations. Such suboperations can be included in and can be part of the disclosure of this single operation unless they are explicitly excluded.

REFERENCE NUMBER LIST

100 Method
110 Receive environment information
120 Validate the environment information
130 Transmit the environment information with the reliability information
200 Transportation vehicle
202 Message
210 Device
212 One or more interfaces
214 Data processing circuit
300 Method
310 Obtain environment information
320 Transmit the environment information to at least one other transportation vehicle
330 Receive the reliability information from the other transportation vehicle
400 Transportation vehicle
402 Message
500 Transportation vehicle
510 Object
512 Shape
514 Shape
B Information relating to a validation by an external server/backend
CF Information relating to a subsequent change to the payload
ID Identifier
M Payload
P1 Information relating to a position of a sensor
P2 Information relating to a position of one or more objects
VC Validity counter

The invention claimed is:

1. A device for a transportation vehicle, the device comprising:
one or more interfaces configured to communicate with other transportation vehicles in which messages are transmitted and received; and
a data processing circuit configured to:
receive environment information relating to an environment of the transportation vehicle in a message from another transportation vehicle via the one or more interfaces,
validate whether the received environment information is reliable and, based on the validation, generate reliability information indicating a determination of a degree of reliability validation having been determined by the data processing circuit for the environment information, wherein the validation comprises automatic comparison of the environment information with sensor data from at least one sensor of the transportation vehicle performed in response to receipt of the environment information,
embed the validated environment information and the generated reliability information in a message for transmission with control information and payload; and
transmit the validated environment information along with the generated reliability information to the other transportation vehicle,
wherein the validated environment information is assigned to the payload of the transmitted message and the generated reliability information is assigned to the control information of the transmitted message,
wherein the control information also includes an identifier assigned to the message, wherein the identifier and the generated reliability information in the control information of the transmitted message are analyzed by transportation vehicles receiving messages to determine an extent to which received messages with the same identifier require decoding and whether the received messages include environment information that requires validation based on whether the environment information has been previously validated by other transportation vehicles prior to receipt by the transportation vehicle,
wherein the generated reliability information indicates the determination of the degree of reliability validation having been determined for the environment information by a validity counter that indicates a number of times that the environment information has been validated at other vehicles,
wherein the validity counter is incremented prior to transmission of the message to other transportation vehicles in response to the environment information being validated by the comparison with sensor data from at least one sensor of the transportation vehicle performed in response to receipt of the environment information,
wherein the validity counter is decremented prior to transmission of the message in response to other transportation vehicles in response to the environment information in the message being refuted by the comparison with sensor data from at least one sensor of the transportation vehicle performed in response to receipt of the environment information, and
wherein selection of at least one sensor of a plurality of sensors on the transportation vehicle for gathering environmental information for use in autonomous or partially autonomous driving of the transportation vehicle is based in part on the degree of reliability validation previously determined by other transportation vehicles prior to receipt by the transportation vehicle.

2. The device of claim 1, wherein the environment information comprises measurement data of the environment, interpreted measurement data and/or a user input.

3. The device of claim 1, wherein the validation further comprises validating the environment information based on a user input.

4. The device of claim 3, wherein the data processing circuit is further configured to receive information relating to a sensor class of at least one sensor with which the environment information is determined by the other transportation vehicle, and the validation further comprises selecting a different sensor class based on the information relating to the sensor class to compare the environment information with the sensor data from the different sensor class.

5. The device of claim 1, wherein receiving environment information comprises receiving first reliability information relating to the environment information from another transportation vehicle, wherein validating the environment information comprises generating second reliability information based on the first reliability information, and wherein transmitting the environment information with the reliability information comprises transmitting the second reliability information.

6. A transportation vehicle comprising the device of claim 1.

7. The device of claim 1, wherein the selection of the at least one sensor of a plurality of sensors on the transportation vehicle for gathering environmental information for use in autonomous or partially autonomous driving of the transportation vehicle is based in part on the sensor class of the sensor with which the environment information was determined by the other transportation vehicle.

8. The device of claim 1, wherein the validity counter is incremented or decremented by a value that is specific to a source of data on the transportation vehicle used to validate or refute the previously validated environment information, wherein the increment/decrement value is indicative of a reliability of validation performed by the source of data on the transportation vehicle.

9. A method performed in a transportation vehicle, the method comprising:
receiving environment information relating to an environment of the transportation vehicle in a message from another transportation vehicle via one or more interfaces of a device on the transportation vehicle;
validating whether the received environment information is reliable and, based on the validation, generating reliability information indicating a determination of a degree of reliability validation having been determined by the data processing circuit for the environment information, wherein the validation comprises automatic comparison of the environment information with sensor data from at least one sensor of the transportation vehicle performed in response to receipt of the environment information;
embedding the validated environment information and the generated reliability information in a transmitted message with control information and payload; and
transmitting the validated environment information with the generated reliability information,
wherein the validated environment information is assigned to the payload of the transmitted message and the generated reliability information is assigned to the control information of the transmitted message,
wherein the control information also includes an identifier assigned to the message,
wherein the identifier and the generated reliability information in the control information of the transmitted message are analyzed by transportation vehicles receiving messages to determine an extent to which received messages with the same identifier require decoding and whether the received messages include environment information that requires validation based on whether the environment information has been previously validated by other transportation vehicles prior to receipt by the transportation vehicle,
wherein the generated reliability information indicates the determination of the degree of reliability validation having been determined for the environment information by a validity counter that indicates a number of times that the environment information has been validated at other vehicles,
wherein the validity counter is incremented prior to transmission of the message to other transportation vehicles in response to the environment information being validated by the comparison with sensor data from at least one sensor of the transportation vehicle performed in response to receipt of the environment information,
wherein the validity counter is decremented prior to transmission of the message in response to other transportation vehicles in response to the environment information in the message being refuted by the comparison with sensor data from at least one sensor of the transportation vehicle performed in response to receipt of the environment information, and
wherein selection of at least one sensor of a plurality of sensors on the transportation vehicle for gathering environmental information for use in autonomous or partially autonomous driving of the transportation vehicle is based in part on the degree of reliability validation previously determined by other transportation vehicles prior to receipt by the transportation vehicle.

10. The method of claim 9, wherein the environment information comprises measurement data of the environment, interpreted measurement data and/or a user input.

11. The method of claim 9, wherein the validation further comprises validating the environment information based on a user input.

12. The method of claim 11, further comprising receiving information relating to a sensor class of at least one sensor with which the environment information is determined by the other transportation vehicle, and the validation further comprises selecting a different sensor class based on the information relating to the sensor class to compare the environment information with the sensor data from the different sensor class.

13. The method of claim 9, wherein receiving environment information comprises receiving first reliability information relating to the environment information from another transportation vehicle, wherein validating the environment information comprises generating second reliability information based on the first reliability information, and wherein transmitting the environment information with the reliability information comprises transmitting the second reliability information.

14. A non-transitory computer readable medium comprising a computer program having a program code to perform the method of claim 9 when the program code is executed on a computer, a processor, a data processing circuit, a control module or a programmable hardware component.

15. The method of claim 9, wherein the selection of the at least one sensor of a plurality of sensors on the transportation vehicle for gathering environmental information for use in autonomous or partially autonomous driving of the transportation vehicle is based in part on the sensor class of the sensor with which the environment information was determined by the other transportation vehicle.

16. The method of claim 9, wherein the validity counter is incremented or decremented by a value that is specific to a source of data on the transportation vehicle used to validate or refute the previously validated environment information, wherein the increment/decrement value is indicative of a reliability of validation performed by the source of data on the transportation vehicle.

17. A method for transportation vehicle communication, the method comprising:
obtaining environment information relating to an environment of the transportation vehicle from a traffic infrastructure and/or from one or more further transportation vehicles;
transmitting the environment information to at least one other transportation vehicle for validation of the environment information by the other transportation vehicle, wherein the other transportation vehicle validates the received environment information and generates reliability information indicating a determination of a degree of reliability validation having been determined for the environment information, wherein the validation comprises automatic comparison of the environment information with sensor data from at least one sensor of the transportation vehicle performed in response to receipt of the environment information by the other transportation vehicle; and
receiving the generated reliability information from the other transportation vehicle,
wherein the generated reliability information is received from the other transportation vehicle along with the validated environment information embedded in a transmitted message having control information and payload,
wherein the validated environment information is assigned to the payload of the transmitted message and the generated reliability information is assigned to the control information of the transmitted message,
wherein the control information also includes an identifier assigned to the message,
wherein the identifier and the generated reliability information in the control information of the transmitted message are analyzed by the transportation vehicle to determine an extent to which received messages with the same identifier require decoding and whether the received messages include environment information that requires validation based on whether the environment information has been previously validated by other transportation vehicles prior to receipt by the transportation vehicle,
wherein the generated reliability information indicates the determination of the degree of reliability validation having been determined for the environment information by a validity counter that indicates a number of times that the environment information has been validated at other vehicles,
wherein the validity counter is incremented prior to transmission of the message to other transportation vehicles in response to the environment information being validated by the comparison with sensor data from at least one sensor of the transportation vehicle performed in response to receipt of the environment information,
wherein the validity counter is decremented prior to transmission of the message in response to other transportation vehicles in response to the environment information in the message being refuted by the comparison with sensor data from at least one sensor of the transportation vehicle performed in response to receipt of the environment information, and
wherein selection of at least one sensor of a plurality of sensors on the transportation vehicle for gathering environmental information for use in autonomous or partially autonomous driving of the transportation vehicle is based in part on the degree of reliability validation previously determined by other transportation vehicles prior to receipt by the transportation vehicle.

18. The method of claim 17, wherein the generated reliability information indicates the determination of the degree of reliability validation having been determined for the environment information by a validity counter that indicates a number of times that the environment information has been validated by vehicles, vehicle sensors or humans.

19. The method of claim 17, wherein the environment information comprises measurement data of the environment, interpreted measurement data and/or a user input.

20. The method of claim 17, wherein the validation further comprises validating the environment information based on a user input.

21. The method of claim 20, further comprising receiving information relating to a sensor class of at least one sensor with which the environment information is determined by the other transportation vehicle, and the validation further comprises selecting a different sensor class based on the information relating to the sensor class to compare the environment information with the sensor data from the different sensor class.

22. The method of claim 17, wherein receiving environment information comprises receiving first reliability information relating to the environment information from another transportation vehicle, wherein validating the environment information comprises generating second reliability information based on the first reliability information, and wherein transmitting the environment information with the reliability information comprises transmitting the second reliability information.

23. A non-transitory computer readable medium comprising a computer program having a program code to perform the method of claim 17 when the program code is executed on a computer, a processor, a data processing circuit, a control module or a programmable hardware component.

24. The method of claim 17, wherein the selection of the at least one sensor of a plurality of sensors on the transportation vehicle for gathering environmental information for use in autonomous or partially autonomous driving of the transportation vehicle is based in part on the sensor class of the sensor with which the environment information was determined by the other transportation vehicle.

25. The method of claim 17, wherein the validity counter is incremented or decremented by a value that is specific to a source of data on the transportation vehicle used to validate or refute the previously validated environment information, wherein the increment/decrement value is indicative of a reliability of validation performed by the source of data on the transportation vehicle.

* * * * *